United States Patent [19]

Shallenberger et al.

[11] Patent Number: 4,639,998
[45] Date of Patent: Feb. 3, 1987

[54] LOCKING TUBE REMOVAL AND REPLACEMENT TOOL AND METHOD IN A RECONSTITUTABLE FUEL ASSEMBLY

[75] Inventors: John M. Shallenberger, Fox Chapel; Stephen J. Ferlan, Wilkins Township, Allegheny County, both of Pa.

[73] Assignee: Westinghouse Electric Corp., Pittsburgh, Pa.

[21] Appl. No.: 670,418

[22] Filed: Nov. 9, 1984

[51] Int. Cl.⁴ .................. B23P 19/00; B23P 17/00
[52] U.S. Cl. .................. 29/426.5; 29/400 N; 29/723
[58] Field of Search .............. 29/255, 400 N, 723, 29/426.5; 269/48.1

[56] References Cited

U.S. PATENT DOCUMENTS

| | | | |
|---|---|---|---|
| 2,641,831 | 6/1953 | Helton | 29/255 |
| 2,767,677 | 10/1956 | Johnson et al. | 269/48.1 |
| 3,228,678 | 1/1966 | Koger | 269/48.1 |

Primary Examiner—Howard N. Goldberg
Assistant Examiner—Steven Nichols

[57] ABSTRACT

A tool for removing a locking tube from a locking position in the upper end portion of a guide thimble inserted within a passageway in a removable top nozzle of a reconstitutable fuel assembly includes an inner tubular member attached at its upper end to a bail assembly and at its lower end to a tubular extension having an expandable and collapsable lower end. Also, an actuatable shaft assembly of the tool is mounted for axial movement within the inner tubular member and lower tubular extension and has a conical nose disposed on its lower end which extends beyond a rim formed on the lower end of the tubular extension and an actuating knob coupled to its upper end. Rotation of the knob in one direction causes insertion of the conical nose into the lower end of the tubular extension and thereby increase in the circumference of the rim such that it will engage a lower edge of the locking tube when the tool is forced in an upward direction. An outer tubular member of the tool is disposed about the inner member and mounted for slidable movement therealong. The outer tubular member is manually moved in a reciprocating manner to deliver a series of forceful impacts to the bail assembly of the tool which impacts are, in turn, transmitted via the inner member to the lower end of the tubular extension. When the latter is expanded into engagement with the lower edge of the locking tube, the force of each impact will displace the locking tube in an upward axial direction to remove the tube from its locking position.

1 Claim, 6 Drawing Figures

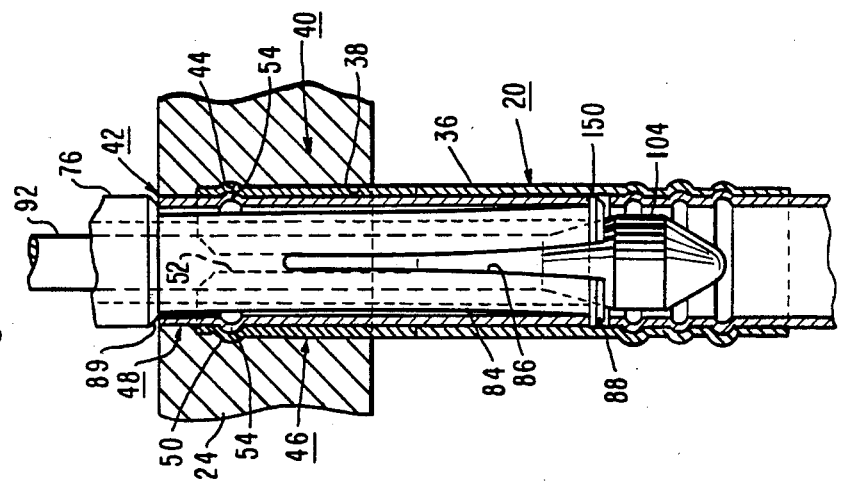
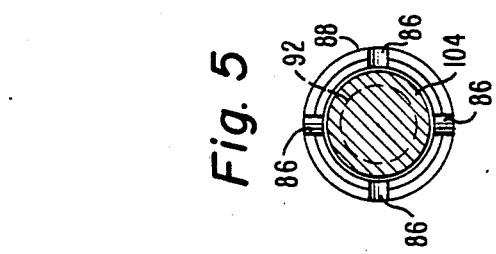
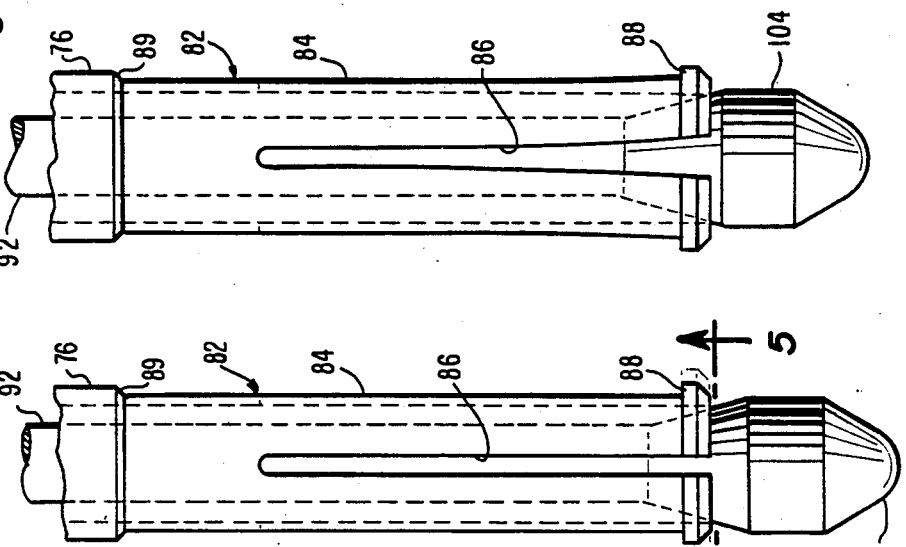

LOCKING TUBE REMOVAL AND REPLACEMENT TOOL AND METHOD IN A RECONSTITUTABLE FUEL ASSEMBLY

CROSS REFERENCE TO RELATED APPLICATIONS

Reference is hereby made to the following copending applications dealing with related subject matter and assigned to the assignee of the present invention:

1. "Nuclear Reactor Fuel Assembly with a Removable Top Nozzle" by John M. Shallenberger et al, assigned U.S. Ser. No. 644,758 and filed Aug. 27, 1984.

2. "Top Nozzle Removal and Replacement Fixture and Method in a Reconstitutable Fuel Assembly" by John M. Shallenberger et al, assigned U.S. Ser. No. 670,729 and filed Nov. 13, 1984.

BACKGROUND OF THE INVENTION

1. Field of the Invention

The present invention relates generally to fuel assemblies for nuclear reactors and, more particularly, is concerned with a tool and method for removing a locking tube from and replacing it in a locking position in a removable top nozzle of a reconstitutable fuel assembly.

2. Description of the Prior Art

In most nuclear reactors, the reactor core is comprised of a large number of elongated fuel assemblies. Conventional designs of these fuel assemblies include a plurality of fuel rods and control rod guide thimbles held in an organized array of grids spaced along the fuel assembly length and attached to the control rod guide thimbles. Top and bottom nozzles on opposite ends of the fuel assembly are secured to the guide thimbles which extend slightly above and below the ends of the fuel rods. At the top end of the fuel assembly, the guide thimbles are attached in passageways provided in the adapter plate of the top nozzle. The guide thimbles may each include an upper sleeve for attachment to the top nozzle.

During operation of such fuel assembly in a nuclear reactor, a few of the fuel rods may occasionally develop cracks along their lengths resulting primarily from internal stresses, thus establishing the possibility that fission products having radioactive characteristics may seep or otherwise pass into the primary coolant of the reactor. Such products may also be released into a flooded reactor cavity during refueling operations or into the coolant circulated through pools where the spend fuel assemblies are stored. Since the fuel rods are part of the integral assembly of guide thimbles welded to the top and bottom nozzles, it is difficult to detect and remove the failed rods.

Until recently, to gain access to these rods it was necessary to remove the affected assembly from the nuclear reactor core and then break the welds which secure the nozzles to the guide thimbles. In so doing, the destructive action often renders the fuel assembly unfit for further use in the reactor because of the damage done to both the guide thimbles and the nozzle which prohibits rewelding.

In view of the high costs associated with replacing fuel assemblies, considerable interest has arisen in reconstitutable fuel assemblies in order to minimize operating and maintenance expenses. The general approach to making a fuel assembly reconstitutable is to provide it with a removable top nozzle. One reconstitutable fuel assembly construction, devised recently, is illustrated and described in the first U.S. patent application cross-referenced above. It incorporates an attaching structure for removably mounting the top nozzle on the upper ends of the control rod guide thimbles.

The attaching structure includes a plurality of outer sockets defined in an adapter plate of the top nozzle, a plurality of inner sockets with each formed on the upper end of one of the guide thimbles, and a plurality of removable locking tubes inserted in the inner sockets to maintain them in locking engagement with the outer sockets. Each outer socket is in the form of a passageway through the adapter plate which has an annular groove. Each inner socket is in the form of a hollow upper end portion of the guide thimble having an annular bulge which seats in the annular groove when the guide thimble end portion is inserted in the adapter plate passageway. A plurality of elongated axial slots are provided in the guide thimble upper end portion to permit inward elastic collapse of the slotted portion so as to allow the larger bulge diameter to be inserted within and removed from the annular circumferential groove in the passageway of the adapter plate. In such manner, the inner socket of the guide thimble is inserted into and withdrawn from locking engagement with the outer socket.

The locking tube is inserted from above the top nozzle into a locking position in the hollow upper end portion of the guide thimble forming the inner socket. When inserted in its locking position, the locking tube retains the bulge of the inner socket in its expanded locking engagement with the annular groove and prevents the inner socket from being moved to a compressed releasing position in which it could be withdrawn fom the outer socket. In such manner, the locking tubes maintain the inner sockets in locking engagement with the outer sockets, and thereby the attachment of the top nozzle on the upper ends of the guide thimbles. Furthermore, due to vibration forces and the like, it is desirable to secure the locking tubes in their locking positions. For such purpose, suitable means, such as a pair of bulges, are formed in the upper portion of each locking tube after insertion in its locking position which bulges fit into the circumferential bulge in the upper end portion of the guide thimble.

While the reconstitutable fuel assembly construction briefly described above has demonstrated considerable promise as a measure by which domestic and foreign utilities can minimize both operating and maintenance expenses, a need exists for means to effectively and efficiently carry out removal and replacement of the locking tubes and top nozzle of the reconstitutable fuel assembly so as to enhance commercial acceptance thereof.

SUMMARY OF THE INVENTION

The present invention together with other components, some of which comprise the invention disclosed and claimed in the second U.S. patent application cross-referenced above, provide a system of remotely-operated, submersible equipment designed to satisfy the aforementioned needs. The equipment is operable to remove and subsequently remount or replace the locking tubes and top nozzle of a reconstitutable fuel assembly, such as the one disclosed in the first U.S. patent application cross-referenced above, at a reactor plant. After the locking tubes and top nozzle have been removed, the upper ends of the fuel rods are exposed from the top of the reconstitutable fuel assembly. Thus, access to the fuel rods is gained for any of a variety of purposes: inspecting them for failure, removing and replacing failed rods, transferring partially spent fuel rods from one assembly to another, and/or rearrangement of fuel rods to attain better uranium utilization in the reactor core. Once inspection, removal, replacement and/or rearrangement of the fuel rods is completed, the top nozzle is placed back on the upper ends of the guide thimbles and the locking tubes replaced in their locking positions.

The present invention provides a tool and method for removing the locking tubes from and replacing them in locking positions in the removable top nozzle of the reconstitutable fuel assembly. Furthermore, the locking tubes are removed and replaced one at a time. In view that the locking tubes are friction fitted with the upper end portions of the guide thimbles, such as by means of the pair of diagonally opposed bulges or dimples in each of the tubes which interengage with the circumferential bulge in the guide thimble upper end portion, sufficient force must be applied to each locking tube to overcome the resistive force generated by this type of connection. However, care must be taken in selecting the mode in which the necessary removal force is applied to the locking tube. For instance, one might normally expect that a linearly-directed force applied in one continuous motion to the tube would be adequate to remove it from the guide thimble upper end portion. However, such mode is likely to cause deformation of the tube and jamming of the deformed tube within the guide thimble and adapter plate passageway. Instead, the tool and method of the present invention involves the delivery of a series of small, but forceful blows or taps against the tube, to move the tube relative to the guide thimble for removal of the tube from its locking position.

Accordingly, the present invention sets forth for use with a reconstitutable fuel assembly including a top nozzle with an adapter plate having at least one passageway, at least one guide thimble with an upper end portion and an attaching structure having a hollow locking tube for releasably locking the upper end portion of the guide thimble within the passageway of the top nozzle adapter plate, a tool and method for removing the locking tube from its locking position as a first step in removing the top nozzle from the reconstitutable fuel assembly.

The tool for removing the locking tube includes: (a) an elongated inner hollow tubular force-transmitting member having upper and lower opposite ends; (b) a force-receiving member fixedly attached to the upper end of the force-transmitting member; (c) locking tube-engaging means fixedly attached to the lower end of the force-transmitting member and being circumferentially expandable and collapsable; (d) an outer hollow tubular force-imparting member disposed about the inner force-transmitting member and slidably movable therealong in a reciprocating manner for delivering a sequence of forceful impacts against the force-receiving member; (e) an elongated shaft means extending through the force-transmitting member between the ends thereof and mounted for axially movement therealong, the shaft means having upper and lower opposite ends; (f) means coupled to the upper end of the shaft means and being operable to cause axial movement of the shaft means between extended and retracted positions relative to the force-transmitting member; and (g) means attached to the lower end of the shaft means and movable between disengaged and engaged positions relative to the locking tube-engaging means, the latter assuming a circumferentially-collapsed position when the shaft means is at one of its positions and the movable means is at its disengaged position and a circumferentially-expanded position when the shaft means is at the other of its positions and the movable means is at its engaged position such that repeated reciprocation of the force-imparting member will cause delivery of a sequence of impacts against the force-receiving member and via the force-transmitting member and tube-engaging means against the lower end of the locking tube so as to provide sufficient force to incrementally move the locking tube relative to the guide thimble from its locking position.

The method of using the tool to remove the locking tube includes the operative steps of: (a) positioning the tool in axial alignment with the locking tube; (b) lowering the tool into the locking tube until a lower end portion of the tool is disposed adjacent a lower end portion of the locking tube; (c) expanding the circumference of the lower end portion of the tool so as to place the same in engagement with the lower end portion of the locking tube; (d) delivering at least one forceful impact in an upward axial direction to an upper portion of the tool; (e) transmitting the force of said impact from the upper portion to the lower end portion of the tool so as to displace the locking tube in an upward axial direction; and (f) repeating the preceding steps (d) and (e) should the force of said one impact be insuffient to dislodge said tube from its locking position.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 3 is an enlarged fragmentary side elevational view of the lower end portion of the tool of FIG. 2, depicting the conical nose withdrawn sufficiently from the segmented sleeve of the tool to allow a segmented rim on the sleeve to assume a collapsed position in which its outside diameter is less that of the inside diameter of the locking tube.

FIG. 4 is an enlarged side elevational view of the lower end portion of the tool similar to that of FIG. 3, but depicting the conical nose inserted sufficiently into the segmented sleeve of the tool to force the segmented rim on the sleeve to an expanded position in which its outside diameter is greater than the inside diameter of the locking tube.

FIG. 5 is a sectional view of the lower end portion of the tool as taken along line 5—5 of FIG. 3.

FIG. 6 is an enlarged side elevational view, partially in section, of the lower end portion of the tool inserted within the locking tube which is disposed in its locking position in the upper end portion of the guide thimble, the segmented rim on the segmented sleeve of the tool being in its expanded position of FIG. 4 and engaged with the lower edge of the locking tube.

DETAILED DESCRIPTION OF THE INVENTION

Figure 1:
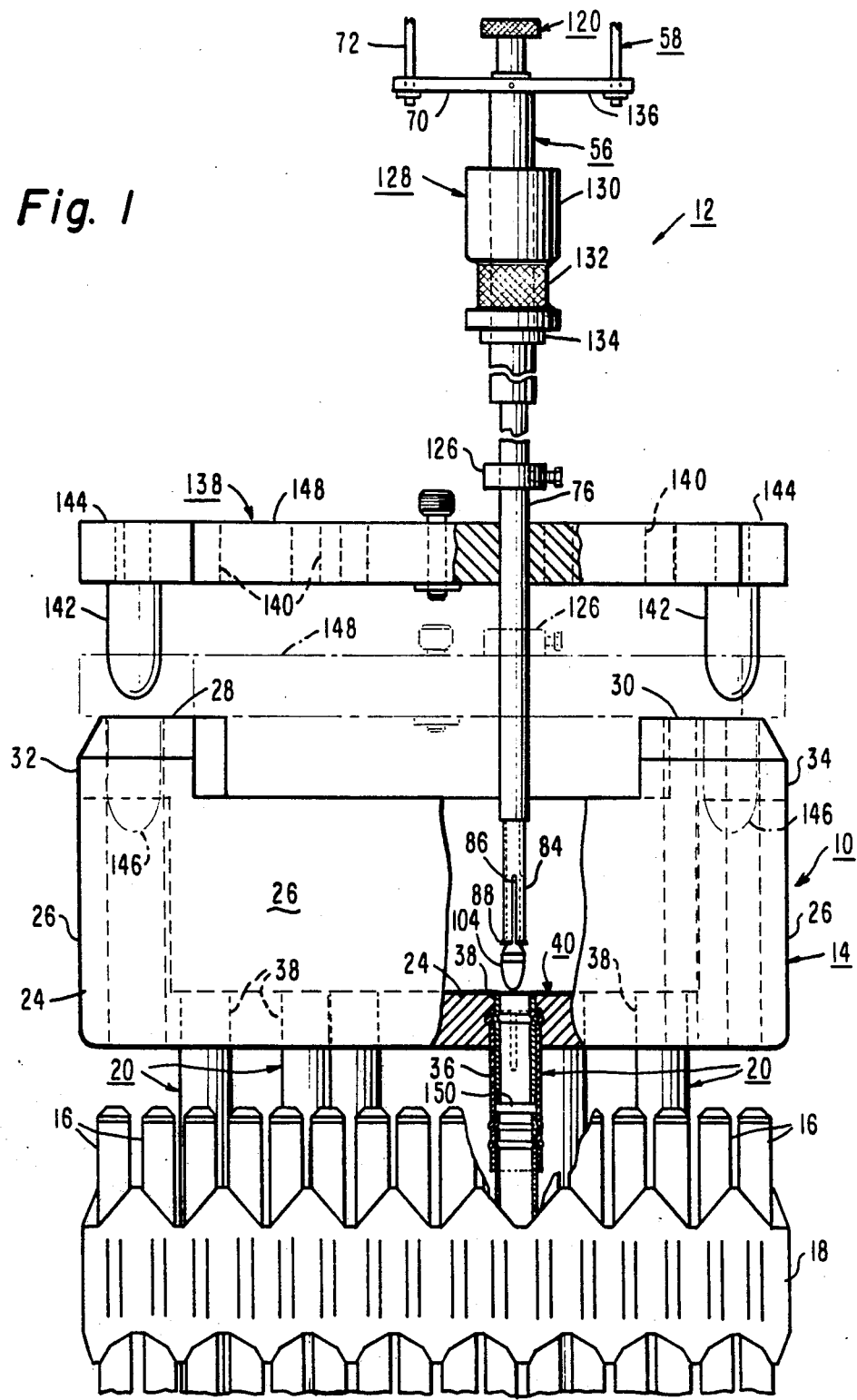
FIG. 1 is a fragmentary side elevational view of the upper end of a reconstitutable fuel assembly, with parts partially sectioned and broken away for purpose of clarity, and of the tool of the present invention employed in removing the locking tubes from the top nozzle of the assembly.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown the upper end of a reconstitutable fuel assembly, being generally designated by the numeral 10, on which a tool of the present invention, generally indicated 12 (also seen in FIG. 2), and a fixture (not shown) forming the invention of the second cross-referenced patent application are employed in removing and replacing a top nozzle 14 from and onto the fuel assembly 10.

Basically, the fuel assembly 10, being of conventional construction, includes an array of fuel rods 16 held in spaced relationship to one another by a number of grids 18 (only one being shown) spaced along the fuel assembly length. Each fuel rod 16 includes nuclear fuel pellets (not shown) and is sealed at its opposite ends. The fuel pellets composed of fissible material are responsible for creating the reactive power of the nuclear reactor core in which the assembly 10 is placed. A liquid moderator/coolant such as water, or water containing boron, is pumped upwardly through the fuel assemblies of the core in order to extract heat generated therein for the production of useful work.

The reconstitutable fuel assembly 10 also includes a number of longitudinally extending guide tubes or thimbles 20 along which the grids 18 are spaced and to which they are attached. The opposite ends of the guide thimbles 20 extend a short distance past the opposite ends of the fuel rods 16 and are attached respectively to a bottom nozzle (not shown) and the top nozzle 14.

To control the fission process, a number of control rods (not shown) are reciprocally movable in the guide thimbles 20 located at predetermined positions in the fuel assembly 10. Specifically, the top nozzle 14 includes a rod cluster control mechanism (not shown) interconnected to the control rods and operable to move the control rods vertically in the guide thimbles 20 to thereby control the fission process in the fuel assembly 10, all in a well-known manner.

As illustrated in FIG. 1, the top nozzle 14 comprises a housing 22 having a lower adapter plate 24 surrounded by four interconnected, upstanding side walls 26 with raised sets of pads 28, 30 (only one pad in each set being shown) located respectively at pairs of diagonal corners 32, 34 formed by the side walls 26. As more clearly seen in FIG. 6, the control rod guide thimbles 20 have their uppermost end portions 36 coaxially positioned within control rod passageways 38 formed through the adapter plate 24 of the top nozzle 14. For gaining access to the fuel rods 16, the adapter plate 24 of the top nozzle 14 is removably connected to the upper end portions 36 of the guide thimbles 20 by an attaching structure, generally designated 40. The attaching structure 40 will be described herein to the extent necessary to facilitate an understanding of the structure and operation of the tool 12 comprising the present invention. However, a more thorough understanding of the attaching structure 40 can be gained from the first patent application crossreferenced above, the disclosure of which is incorporated herein by reference.

Top Nozzle Attaching Structure

As best seen in FIG. 6, the attaching structure 40 of the reconstitutable fuel assembly 10 includes a plurality of outer sockets 42 defined in the top nozzle adapter plate 24 by the plurality of passageways 38 which each contain an annular circumferential groove 44, a plurality of inner sockets 46 defined on the upper end portions 36 of the guide thimbles 20, and a plurality of removable locking tubes 48 inserted in the inner sockets 46 to maintain them in locking engagement with the outer sockets 42. Each inner socket 46 is defined by an annular circumferential bulge 50 on the hollow upper end portion 36 of one guide thimble 20. A plurality of elongated axial slots 52 are formed in the upper end portion 36 of each guide thimble 20 to permit inward elastic collapse of the slotted end portion to a compressed position so as to allow the circumferential bulge 50 thereon to be inserted within and removed from the annular groove 44 via the adapter plate passagway 38. The annular bulge 50 seats in the annular groove 44 when the guide thimble end portion 36 is inserted in the adapter plate passageway 38 and has assumed an expanded position. In such manner, the inner socket 46 of each guide thimble 20 is inserted into and withdrawn from locking engagement with one of the outer sockets 42 of the adapter plate 24.

The locking tubes 48 of the attaching structure 40 are inserted from above the top nozzle 14 into their respective locking positions in the hollow upper end portions 36 of the guide thimbles 20 forming the inner sockets 46. When each locking tube 48 is inserted in its locking position, it retains the bulge 50 of the inner socket 46 in the latter's expanded locking engagement with the annular groove 44 and prevents the inner socket 46 from being moved to its compressed releasing position in which it could be withdrawn from the outer socket 42. In such manner, the locking tubes 48 maintain the inner sockets 46 in locking engagement with the outer sockets 42, and thereby the attachment of the top nozzle 14 on the upper end portions 36 of the guide thimbles 20.

Ordinarily, the locking tubes 48 are dimensioned to have a tight frictional fit with the sidewalls of the adapter plate passageways 38 for maintaining the tubes 48 in their locking positions. However, due to vibrational forces and the like, it is sometimes desirable to secure the locking tubes 48 in their locking positions. For such purpose, suitable means, such as a pair of dimples or bulges 54, are formed in the upper portion of each locking tube 48 after insertion to its locking position. The bulges 54 fit into the circumferential bulge 50 in the upper end portion 36 of the guide thimble 20.

Tool for Removing and Replacing the Top Nozzle

For effectuating inspection, removal, replacement and/or rearrangement of fuel rods 16 contained in the reconstitutable fuel assembly 10, the assembly must be removed from the reactor core and lowered into a work station (not shown) by means of a standard fuel assembly handling tool (not shown). In the work station, the fuel assembly is submerged in coolant and thus maintenance operations are performed by manipulation of remotely-controlled submersible equipment. One component of such equipment is the tool 12 of the present invention for removing the locking tubes 48 as a first step in removing the top nozzle 14 from the reconstitutable fuel assembly 10. Another components of such equipment is the fixture (not shown) forming the invention illustrated and described in the second patent application cross-referenced above. After the locking tubes have been removed, the fixture is used for removing and subsequently replacing the top nozzle 14 from and on the guide thimbles 20 of the reconstitutable fuel assembly 10.

Figure 2:
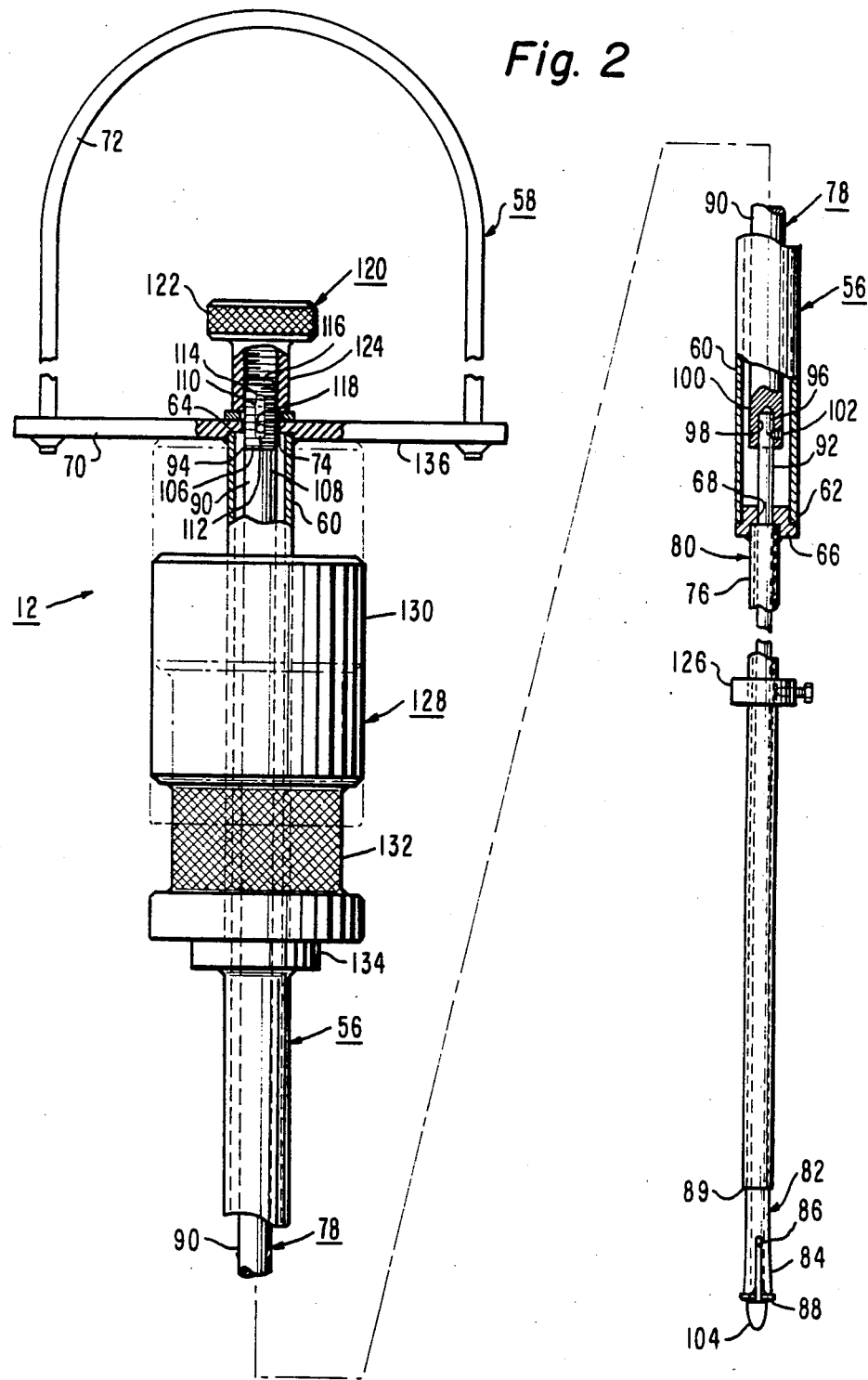
FIG. 2 is an enlarged side elevational view of the tool of FIG. 1, with the tool partially sectioned and being illustrated in a foreshortened form.

Referring again to FIG. 1 and now also to FIG. 2, there is shown the tool 12 useful both in removing and replacing each locking tube 48 from and into its locking position in the top nozzle 14. The tool 12 includes an elongated inner tubular member 56 and a bail assembly 58 attached thereto. The tubular member 56 is formed of a hollow cylindrical tube-like body 60 having open opposite lower and upper ends 62, 64 and of an annular plug 66 attached within the lower end 62 of the body 60 by any suitable means, for instance, by being welded thereto. The annular plug 66 has a central opening 68 through it. The bail assembly 58 is formed of a generally flat plate 70 disposed in transverse relationship to the axial extent of the cylindrical body 60 and centrally attached, such as by welding, to the upper end 64 thereof and of a bail or handle loop 72 connected to opposite peripheral portions of the plate 70 and extending upwardly therefrom. The flat plate 70 has a central bore 74 formed through it.

The tool 12 further includes a hollow tubular extension 76 and an elongated actuating shaft assembly 78. The tubular extension 76 is fixed at its upper end portion 80, such as by welding, to the annular plug 66 at the lower end 62 of inner tubular member 56. Also the tubular extension 76 is axially aligned with the central opening 68 of the plug 66. A lower end portion 82 of the tubular extension 76 is formed in the configuration of a segmented sleeve 84 by a plurality of axially-extending slots 86 (FIG. 5) defined therein. An outwardly-turned annular segmented flange or rim 88 is formed on the lower end of the sleeve 84. The upper end portion 80 of the tubular extension 76 has a larger diameter than the lower end portion 82. A downwardly-facing ledge or shoulder 89 defines the radial transition or step between the two different diameter sizes of the extension portions 80, 82. The upper edge of the locking tube 48 abuts the shoulder 89 when the tool 12 is inserted in the tube, such as seen in FIG. 6.

In the preferred embodiment, the actuating shaft assembly 78 extends from above the flat plate 70 of the bail assembly 58, through the inner tubular member 56 and the tubular extension 76, and beyond the rim 88 on the segmented sleeve 84 of the extension. The shaft assembly 78 is composed of a central solid shaft 90 disposed in the hollow body 60 of the inner tubular member 56 and extending between the opposite lower and upper ends 62, 64 thereof. The central shaft 90 is mounted in coaxial relationship with the longitudinal axis of the body 60 and in axial alignment with the centers of the central opening 68 in lower annular plug 66 and the central bore 74 in the flat plate 70 by a lower shaft extension 92 and an upper shaft stub 94 of the actuating shaft assembly 78.

The lower shaft extension 92 of the shaft assembly 78 is fixedly attached to central shaft 90 by inserting its upper end 96 a desired distance into an internally-disposed socket 98 defined in the lower end 100 of the central shaft 90 and then by locking the upper end 96 therein by tightening down a set screw 102 threaded into the shaft lower end 100 against a portion of the shaft extension 92 immediately below its upper end 96. From the lower end 100 of the central shaft 90, the lower shaft extension 92 extends downwardly through the central opening 68 in the plug 66 and therefrom through hollow tubular extension 76. The extension 92 has an enlarged conical nose 104 on its lower end which is positioned beyond the lower segmented rim 88 on the segmented sleeve 84 of the tubular extension 76.

The upper shaft stub 94 of the shaft assembly 78 is fixedly attached at its lower end 106, such as by welding, to the upper end 108 of the central shaft 90 and extends upwardly therefrom through the central bore 74 of the flat plate 70 of the bail assembly 58. The shaft stub 94 has an elongated slot 110 defined therein extending in an axial direction but with its opposite lower and upper ends 112, 114 spaced from the lower and upper ends 106, 116 of the stub. A stop pin 118, the purpose for which will become clear below, is mounted to the flat plate 70 so as to extend across the central bore 74 therein and through the elongated slot 110 of the shaft stub 94.

Finally, the actuating shaft assembly 78 includes an actuating means 120 formed of a cylindrical knob 122 connected to a sleeve 124 which has an internally threaded bore 126 adapted to threadably receive the threaded exterior of the shaft stub 94. By manually rotating the knob 122 in a clockwise direction (as view from above the knob) the central shaft 90 and lower shaft extension 92 therewith are moved axially toward the flat plate 70 of the bail assembly 58. On the other hand, by manually rotating the knob 122 in a counterclockwise direction, the central shaft 90 and extension 92 are moved axially away from the plate 70. The stop pin 118 not only mounts the shaft assembly 78 on the flat plate 70 of the bail assembly 58, but also prevents the shaft assembly 78 from rotating within the hollow body 60 of the inner tubular member 56 as the knob 122 is threadably rotated on the shaft stub 94 to cause axial movement of the shaft assembly 78. With respect to the segmented sleeve 84, clockwise rotation of the knob 122 causes the shaft extension 92 to retract within the tubular extension 76 and forcibly insert the conical nose 104 into the segmented sleeve 84 through the segmented rim 88 on the terminal end thereof to the position seen in FIGS. 4 and 6. Such insertion of the nose 104 causes expansion of the circumference of the segmented rim 88. On the other hand, counterclockwise rotation of the knob 122 causes the shaft extension 92 to extend from the tubular extension 76 and withdraw the conical nose 104 from the segmented sleeve 84 to the position seen in FIG. 3. Such withdrawal of the nose 104 allows contraction or collapse of the circumference of the segmented rim 88.

The elongated slot 110 in the shaft stub 94 and the stop pin 118 in the flat plate 70 along with the set screw 102 are used to establish the desired degree of insertion of the conical nose 104 within the segmented sleeve 84. First, the knob 122 is turned clockwise until the lower end 112 of the slot 110 in the shaft stub 94 is brought against the stop pin 118. Such position represents the upper limit to which the actuating shaft assembly 78 can be axially retracted. Incidentally, if the knob 122 is turned counterclockwise until the upper end 114 of the slot 110 in the shaft stub 94 is brought against the stop pin 118, then such position represents the lower limit to which the actuating shaft assembly 78 can be axially extended. Continuing on, next, the shaft extension 92 is inserted into the socket 98 until the conical nose 104 is inserted within the segmented rim 88 of the segmented sleeve 84 and the circumference of the rim 88 is expanded a desired amount. Then, the set screw 102 is tightened down in contact with the shaft extension 92, locking its axial position relative to that of the central shaft 90. The circumference of the segmented rim 88 is expanded the desired amount when it is of a size sufficient to extend under the lower edge of the locking tube 48 when the tubular extension 92 is inserted through it, as seen in FIG. 6. In such position, the segmented rim 88 will engage the lower edge of the locking tube 48 from the bottom thereof as the actuating shaft assembly 78 is moved in an upward direction. An annular collar 126 mounted for slidable adjustment along the tubular extension 92 is set and fixed a predetermined desired distance from the segmented rim 88 so as to ensure that the rim is positioned adjacent to and just below the lower edge of the locking tube 48 when to tool 12 is inserted into a locking tube.

It should be pointed out here that although in the preferred embodiment the tool 12 has been so designed such that in the extended position of the shaft assembly 78 the nose 104 on the lower end of the shaft extension 92 is positioned beyond the lower segmented rim 88 on the segmented sleeve of the tubular extension 76 so as to allow contraction or collapse of the circumference of the segmented rim 88 and in its retracted position the nose 104 is inserted into the segmented sleeve 84 to expand the circumference of the segmented rim 88, the principles of the present invention are equally applicable and include such design wherein the nose 104 is so located within the tubular extension 76 such that retraction of the shaft assembly 78 allows collapse of the segmented rim 88 whereas extension of the shaft assembly 78 causes expansion of the segmented rim 88 to its engaging position. With the preferred design, as the tool 12 is lowered into a locking tube 48, the extended conical nose 104 enters first and clears the passageway from any distortions in the upper end of the tube 48 which may have been caused by irradiation or the like.

Lastly, the tool 12 includes an outer hollow tubular member 128 disposed about the inner tubular member 56 for slidable movement therealong in a reciprocating manner. The outer tubular member 128 is composed of an upper enlarged cylindrical ring-like head 130 connected in tandem with a lower hand grip tubular sleeve 132. A ring 134 fixed about the inner tubular member 56 provides the lower stop or limit of the axial stroke of the outer tubular member 128, while the bottom surface 136 of the flap plate 70 provides the upper stop or limit of the stroke. The purpose of the outer tubular member 128 is to provide a means to deliver a sequence of forceful impacts against the lower edge of the one locking tube 48 within which the tool 12 is inserted in order to dislodge the tube from its locking position within the top nozzle 14.

Method of Using Tool to Remove Locking Tube

Once the reconstitutable fuel assembly 10 is placed into the work station and mounted in position for removal of its top nozzle 14 and inspection of its fuel rods 16, a generally rectangular guide plate 138 having a pattern of openings 140 which match the passageways 38 in the top nozzle 14 is lowered by a long-handled tool (not shown) toward the fuel assembly. A pair of guide pins 142 mounted in diagonally opposite corner extensions 144 of the plate 138 enter a pair of holes 146 formed in correspondingly opposite diagonal corners in the top nozzle 14 such that the plate 138 is anchored on the top nozzle 20 with its openings 140 aligned with the passageways 38 of the top nozzle.

Next, as shown in FIG. 1, removal of each of the locking tubes 48 commences with the lowering of the long-handled tool 12 toward the fuel assembly 10 and positioning the tool in axial alignment with one of the tubes 48 by guiding the lower end of the tool through one of the openings 140 in the guide plate 138 and into a first one of the top nozzle passageways 38 selected for removal of the locking tube 48. The tool 12 is lowered into the locking tube 48 until the annular collar 126 engages the top surface 148 of the guide plate 138. In such position, the segmented rim 88 at the lower end of the tool 12 is placed slightly below the lower edge 150 of the locking tube 48.

The actuating knob 122 is then rotated clockwise until the stop pin 118 is bottomed against the lower end 112 of the slot 110 in the stub 94. Such rotation of the knob 122 causes the shaft extension 92 to retract into the tubular extension 76 and the conical nose 104 to insert into the segmented sleeve 84, radially expanding the circumference of the segmented rim 88 which increases its outside diameter to a dimension greater than the inside diameter of the tube 48 so as to position it in an engaged position as seen in FIG. 6, directly below and in engagement with the lower edge 150 of the locking tube 48. Then, the sleeve 132 of the outer tubular member 128 is gripped manually and reciprocably moved toward and away from the flat plate 70 of the bail assembly 58 in a striking action which delivers a series of forceful impacts in an upward axial direction to the flat plate 70. The force of each blow against the flat plate 70 is transmitted to the lower edge 150 of the locking tube 48 by the segmented rim 88 via the interconnected inner tubular member 56 and lower tubular extension 76 so as to displace the locking tube 48 in an upward direction through a series of incremental movements to remove the tube 48 from its locking position. Occassionally, only one impact is required to dislodge the locking tube 48 from its locking position. In the case where the locking tube 48 has the pair of dimples 54 thereon, the impact forces cause the dimples to gradually deform and move out of locking engagement with the annular bulge 50 in the upper end portion 36 of the guide thimble 20.

After removal, the tool 12 with the attached locking tube 48 is transferred to a disposal container (not shown) where the actuating knob 122 is then rotated counterclockwise, causing the shaft extension 92 to extend from the tubular extension 76 and the conical nose 104 to withdraw from the segmented sleeve 84. The segmented rim 88 then contracts to a disengaged position as seen in FIG. 3, back to its normal circumference where its outside diameter is less than the inside diameter of the locking tube 48, allowing withdrawal of the tool 12 from the locking tube. The locking tube 48 is dropped into the disposal container.

The above-described steps are repeated until all of the locking tubes 48 have been removed from the top nozzle 14. After the top nozzle 14 has been removed and later replaced, the tool 12 is again used to replace a new plurality of locking tubes back into the top nozzle passageways 38 and upper end portions 36 of the guide thimbles 20. Basically, the order of the operations performed using the tool 12 to remove a locking tube 48 are just reversed, with the exception that the outer tubular member 128 used to deliver forceful impacts in removing the locking tube 48 is not used during reinsertion of the tube.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. For use with a reconstitutable fuel assembly including a top nozzle with an adapter plate having at least one passageway, at least one guide thimble with an upper end portion and an attaching structure having a hollow locking tube for releasably locking the upper end portion of the guide thimble within the passageway of the top nozzle adapter plate, a tool for removing the locking tube from its locking position, comprising:

(a) an elongated inner hollow tubular force-transmitting member having upper and lower opposite ends, said force-transmitting member being insertable at its lower end in said locking tube and including
  (i) an elongated inner tubular body having upper and lower ends, and
  (ii) a tubular extension having an upper end fixed to said lower end of said inner tubular body and extending therefrom in axial alignment therewith, an upper end portion of said tubular extension having a larger diameter than a lower end portion thereof so as to define a downwardly-facing shoulder on said tubular extension which abuts said locking tube when said lower end of said force-transmitting member is inserted therein;

(b) a force-receiving member fixedly attached to said upper end of said force-transmitting member;

(c) locking tube-engaging means fixedly attached to said lower end of said force-transmitting member and being circumferentially expandable and collapsable, said locking tube-engaging means being defined on said lower end portion of said tubular extension which constitutes said lower end of said force-transmitting member, said locking tube-engaging means being in the form of an axially segmented sleeve which terminates in a lower segmented rim, said rim being expandable to a first outside diameter greater than an inside diameter of said locking tube and collapsable to a second outside diameter less than said inside diameter of said locking tube;

(d) an outer hollow tubular force-imparting member disposed about said inner force-transmitting member and slidably movable therealong in a reciprocating manner for delivering a sequence of forceful impacts against said force-receiving member, said force-imparting member including
  (i) an upper enlarged cylindrical head, and
  (ii) a lower hand grip tubular sleeve connected in tandem with said head such that upon reciprocable movement of said sleeve along said inner tubular member toward and away from said force-receiving member said head will deliver a series of forceful impacts in an upward axial direction to said force-receiving member, which impacts are transmitted via said inner tubular body and tubular extension to said segmented rim and thereby to said lower edge of said locking tube when said rim is in its engaged position whereby said locking tube is caused to incrementally move and to dislodge from its locking position;

(e) said force-receiving member being in the form of a bail assembly, said bail assembly including
  (i) a generally flat plate fixed to said upper end of said inner tubular force-transmitting member and disposed for receiving said impacts of said head of said force-imparting member, and
  (ii) a handle connected to and extending upwardly from said plate;

(f) an elongated shaft means extending through said force-transmitting member between the ends thereof and mounted for axial movement therealong, said shaft means having upper and lower opposite ends, said shaft means including
  (i) a central shaft disposed in said inner tubular body of said force-transmitting member and having upper and lower ends, and
  (ii) a shaft extension disposed in said tubular extension of said force-transmitting member and having upper and lower ends, said shaft extension being fixed at its upper end to said lower end of said central shaft;

(g) means attached to said upper end of said shaft means and being operable to cause axial movement of said shaft means between extended and retracted positions relative to said force-transmitting member, said operable means including
  (i) an actuating knob threadably coupled to said upper end of said central shaft of said shaft means, and
  (ii) means mounted to said upper end of said inner tubular body of said force-transmitting member and coupled to said central shaft such that rotation of said knob in a first sense causes nonrotational axial movement of said control shaft and said shaft extension of said shaft means in a first direction, to said retracted position, whereas rotation of said knob in a second opposite sense causes nonrotational axial movement of said central shaft and shaft extension of said shaft means in a second direction to said extended position; and (h) means attached to said lower end of said shaft means and movable between disengaged and engaged positions relative to said locking tube-engaging means, the latter assuming a circumferentially-collapsed position when said shaft means is at one of its positions and said movable means is at its disengaged position and a circumferentially-expanded position when said shaft means is at the other of its positions and said movable means is at its engaged position such that repeated reciprocation of said force-imparting member will cause delivery of a sequence of impacts against said force-receiving member and via said force-transmitting member and tube-engaging means against a lower end of said locking tube so as to provide sufficient force to incrementally move said locking tube relative to said guide thimble from its locking position, said means attached to said lower end of said shaft means being in the form of a conical nose fixedly mounted to said lower end of said shaft extension of said shaft means and disposed below said segmented rim of said locking tube-engaging means such that movement of said shaft means to its retracted position moves said conical nose to its engaged position in which it is forcibly inserted into said segmented rim sufficiently to expand the same to its first outside diameter size wherein said segmented rim will engage said lower edge of said locking tube, whereas movement of said shaft means to its extended position moves said conical nose to its disengaged position in which it is withdrawn from said segmented rim sufficiently to allow contraction of the same to its second outside diameter size wherein said segmented rim will fit through said locking tube.

* * * * *